(12) United States Patent
Gallo et al.

(10) Patent No.: US 7,318,116 B2
(45) Date of Patent: Jan. 8, 2008

(54) CONTROL PATH FAILOVER IN AN AUTOMATED DATA STORAGE LIBRARY

(75) Inventors: Frank David Gallo, Rogers, AR (US); Brian Gerard Goodman, Tucson, AR (US); Leonard George Jesionowski, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 637 days.

(21) Appl. No.: 10/290,362

(22) Filed: Nov. 8, 2002

(65) Prior Publication Data

US 2004/0107320 A1 Jun. 3, 2004

(51) Int. Cl.
*G06F 12/00* (2006.01)
*G06F 15/16* (2006.01)
*G06F 11/00* (2006.01)

(52) U.S. Cl. .................. 711/100; 711/162; 709/219; 714/5

(58) Field of Classification Search ............ None
See application file for complete search history.

(56) References Cited

U.S. PATENT DOCUMENTS

| | | | | |
|---|---|---|---|---|
| 4,047,157 A | 9/1977 | Jenkins | .................. | 710/38 |
| 5,285,451 A | 2/1994 | Henson et al. | ............... | 714/6 |
| 5,289,589 A | 2/1994 | Bingham et al. | ........... | 710/316 |
| 5,721,727 A | 2/1998 | Ashi et al. | .............. | 370/244 |
| 5,914,919 A | 6/1999 | Fosler et al. | ............. | 369/30.31 |
| 5,922,077 A | 7/1999 | Espy et al. | ............... | 714/7 |
| 5,944,838 A | 8/1999 | Jantz | ...................... | 714/7 |
| 5,975,738 A | 11/1999 | DeKoning et al. | ........... | 700/70 |
| 6,006,342 A | 12/1999 | Beardsley et al. | ............ | 714/5 |
| 6,035,414 A | 3/2000 | Okazawa et al. | ............ | 714/7 |
| 6,128,750 A | 10/2000 | Espy et al. | ............... | 714/7 |
| 6,131,169 A | 10/2000 | Okazawa et al. | ............ | 714/7 |
| 6,219,800 B1 | 4/2001 | Johnson et al. | .............. | 714/5 |
| 6,304,980 B1 | 10/2001 | Beardsley et al. | ........... | 714/6 |
| 6,336,173 B1 * | 1/2002 | Day et al. | ................... | 711/161 |
| 6,341,356 B1 | 1/2002 | Johnson et al. | .............. | 714/1 |
| 6,356,803 B1 | 3/2002 | Goodman et al. | .......... | 700/214 |
| 6,434,090 B1 | 8/2002 | Basham et al. | .............. | 710/1 |
| 6,449,730 B2 | 9/2002 | Mann et al. | .................. | 714/6 |
| 6,952,792 B2 * | 10/2005 | Emberty et al. | .............. | 714/5 |
| 2003/0120676 A1 * | 6/2003 | Holavanahalli et al. | ..... | 707/102 |
| 2003/0172130 A1 * | 9/2003 | Fruchtman et al. | ......... | 709/219 |
| 2003/0200480 A1 * | 10/2003 | Beattie | ........................ | 714/13 |

FOREIGN PATENT DOCUMENTS

| | | |
|---|---|---|
| EP | 282628 A | 9/1988 |
| JP | 11-232194 A | 8/1999 |
| JP | 000332771 | 11/2002 |

* cited by examiner

*Primary Examiner*—Wen-Tai Lin (57) ABSTRACT

A system, a method, and a computer program product to provide a failover procedure for an automated data storage library are provided. During the operation of a data storage library, a host computer issues control commands to the automated data storage library using one or more control paths. In the event that the host does not receive desirable results, such as when communication is lost between the host computer and the automated data storage library while a command is in process, the host computer may attempt to retry the same command using the same control path or an alternate control path. When the host issues a retry of the same command, the automated data storage library performs an examination of the command and one or more previous commands executed to prevent the automated data storage library from executing an identical command more than once.

14 Claims, 6 Drawing Sheets

CONTROL PATH FAILOVER IN AN AUTOMATED DATA STORAGE LIBRARY

TECHNICAL FIELD

This invention concerns a system to provide automatic control path failover for an automated data storage library by use of one or more control paths between a host computer and the automated data storage library.

BACKGROUND OF THE INVENTION

Automated data storage libraries are known for providing cost effective storage and retrieval of large quantities of data. Automated data storage libraries provide a means for storing data on data storage media that are not permanently mounted in data storage drives, and that are stored on storage shelves inside the library. One or more robot accessors retrieve selected data storage media from storage shelves and provide them to data storage drives. Host computers communicate with the automated data storage library through control paths. A control path is a communication interface that comprises library control commands or signals. The control path interface may comprise serial interfaces such as RS-232, SCSI (Small Computer Systems Interface), FC-AL (Fibre Channel-Arbitrated Loop), etc. In certain system configurations, a host may include multiple host bus adapters (HBAs) that provide multiple physical paths to a device, such as a dual ported tape device. Each of these physical paths could function as one or more control paths. If a host application, such as a data backup application or device driver, is sending commands to an automated data storage library using a control path and the control path experiences a failure, such as a permanent path error (e.g., a failure in the HBA or cable), then the application would cease operating down the failed path. In such a case, failover procedures may be invoked either by a system administrator or automatically by the host computer to either restart the application, or reissue the command, down an alternate path.

If the host computer restarts the application, then any operations performed by the library prior to the failure may be lost. This can create large delays because the application may have to repeat work that may have already been completed. If the host computer reissues the command down an alternate path without knowing if the previous command sent to the automated data storage library was successfully completed then errors may occur. For example, a host computer may encounter a loss of library communication while moving media between a storage slot and a drive. The host computer may not be able to determine if the command completed successfully because there was no response from the automated data storage library to the command. If the host computer retries the same command then it may fail because the library has already successfully completed the command. In other situations, the command retry may cause the cartridge to be moved away from its intended destination if the library has successfully completed an exchange command. For these reasons, there is a need in the art for improved techniques for managing failover operations for automated data storage libraries.

SUMMARY OF THE INVENTION

It is an object of the present invention to provide a failover procedure using one or more control paths between a host computer and an automated data storage library.

Disclosed are a system, a method, and a computer program product to provide a failover procedure for an automated data storage library. During the operation of a data storage library, a host computer issues control commands to the automated data storage library using one or more control paths. In the event that communication is lost between the host computer and the automated data storage library while a command is in process, the host computer may attempt to retry the same command using the same or an alternate control path. In some situations the automated data storage library may have already completed the command but a command completed response was not received by the host computer. When the host issues a retry of the same command, the automated data storage library performs the procedures of the present invention to prevent the automated data storage library from executing an identical command more than once. The procedures of the present invention will also eliminate the need for a host computer to analyze the results of a retry command. For example, if the retry command fails then the host does not have to determine if the error was related to a successful completion of the command on a previous attempt. This invention reduces the occurrence of multiple executions of identical commands by having the automated data storage library examine some or all library control commands before execution.

In one embodiment, every command sent to the automated data storage library is examined to determine if it is a command that may have already been executed successfully. The automated data storage library examines the command and also performs an examination of one or more commands executed previous to receiving this command to determine if the command was already executed. This situation may occur during a retry of a previously issued command where the host computer did not receive a command completed response from the automated data storage library even though the command was executed successfully. If the automated data storage library determines that the command has already been executed successfully then the automated data storage library does not execute the command a second time and it sends a command completed response to the host computer. By eliminating the duplicate execution of a command, the overall operation of the automated data storage library is improved. In this embodiment, some commands may be excluded from this special handling and they may be executed every time they are received. For example, it may be desired to execute the SCSI Test Unit Ready command every time the host sends this command. The same may be true for some data commands, such as the SCSI Read Element Status command.

In a second embodiment, every command sent to the automated data storage library is examined to determine if it is a command that moves data storage media. If the command does not move data storage media then the command is immediately executed by the automated data storage library without any further examination of the command. If the command moves data storage media then the automated data storage library does a further examination of the command and an examination of one or more commands executed previous to receiving this command to determine if the command was already executed. This situation may occur during a retry of a previously issued command where the host computer did not receive a command completed response from the automated data storage library even though the command was executed successfully. If the automated data storage library determines that the command has already been executed successfully then the automated data storage library does not execute the command the second time and it sends a command completed response to the host computer. By eliminating the duplicate execution of a command the overall operation of the automated data storage library is improved. In addition, host control path failover is simplified and less prone to errors.

A third embodiment of the present invention combines additional verification operations with the second embodiment discussed above. The additional verification operations are performed by the automated data storage library to further confirm the successful previous execution of a command. The additional verification operations comprise having the automated data storage library examine the source and/or destination location specified in the command. The automated data storage library then examines the physical source and/or destination location of the data storage media to determine if the data storage media is physically present in either location. Using this additional information the automated data storage library determines if the command has already been executed successfully. If the command was executed successfully then the automated data storage library does not execute the command the second time and it sends a command completed response to the host computer.

For a more complete understanding of the present invention, reference should be made to the following detailed description taken in conjunction with the accompanying drawings.

DETAILED DESCRIPTION OF THE PREFERRED EMBODIMENTS

This invention is described in preferred embodiments in the following description. The preferred embodiments are described with reference to the Figures. While this invention is described in conjunction with the preferred embodiments, it will be appreciated by those skilled in the art that it is intended to cover alternatives, modifications, and equivalents as may be included within the spirit and scope of the invention as defined by the appended claims.

This invention is described in terms of the SCSI command set for a medium changer device. A medium changer is a device that moves data storage media between storage shelves and data storage drives. These devices are also referred to as automated data storage device, storage automation device, library, cartridge loader, etc. References are made to move medium commands and exchange medium commands. These commands are well known to those of skill in the art. For example, the SCSI command set for medium changer devices includes move medium and exchange medium commands. Move medium commands are used to move data storage media from one location to another location within the library. Exchange medium commands are used to improve the performance of a move command by combining more than one move into a single command. For example, a move medium command may move a cartridge from location A to location B. An exchange medium command may move a cartridge from location A to location B, and whatever was present at location B may be moved to location C. Using the SCSI exchange medium command as an example, there are three locations specified in the command. Source address, first destination address and second destination address. Note that address refers to a location identifier and the terms address and location may be used interchangeably. The library location specified by any of the above addresses is a location inside the library that can be accessed by one or more of the robot accessors inside the library. The cartridge at the source address is moved to the first destination address and the cartridge that previously occupied the first destination address is moved to the second destination address. The second destination address may or may not be the same as the source address. In addition, references are made to element status data. Element status data is well known to those of skill in the art. For example, the SCSI command set for medium changer devices includes commands for working with element status data. Element status data comprises a cartridge map of the locations that may contain a cartridge. The cartridge map may comprise information about potential cartridge locations such as whether or not the location contains a cartridge (empty or full), whether or not the cartridge is accessible, the value of the cartridge bar code label, the type of location such as a storage slot or data storage drive, etc. These references are done for descriptive purposes only and one skilled in the art will recognize that other command sets and protocols may be used that provide the same or similar functions without deviating from the spirit and scope of this invention.

Figure 1:
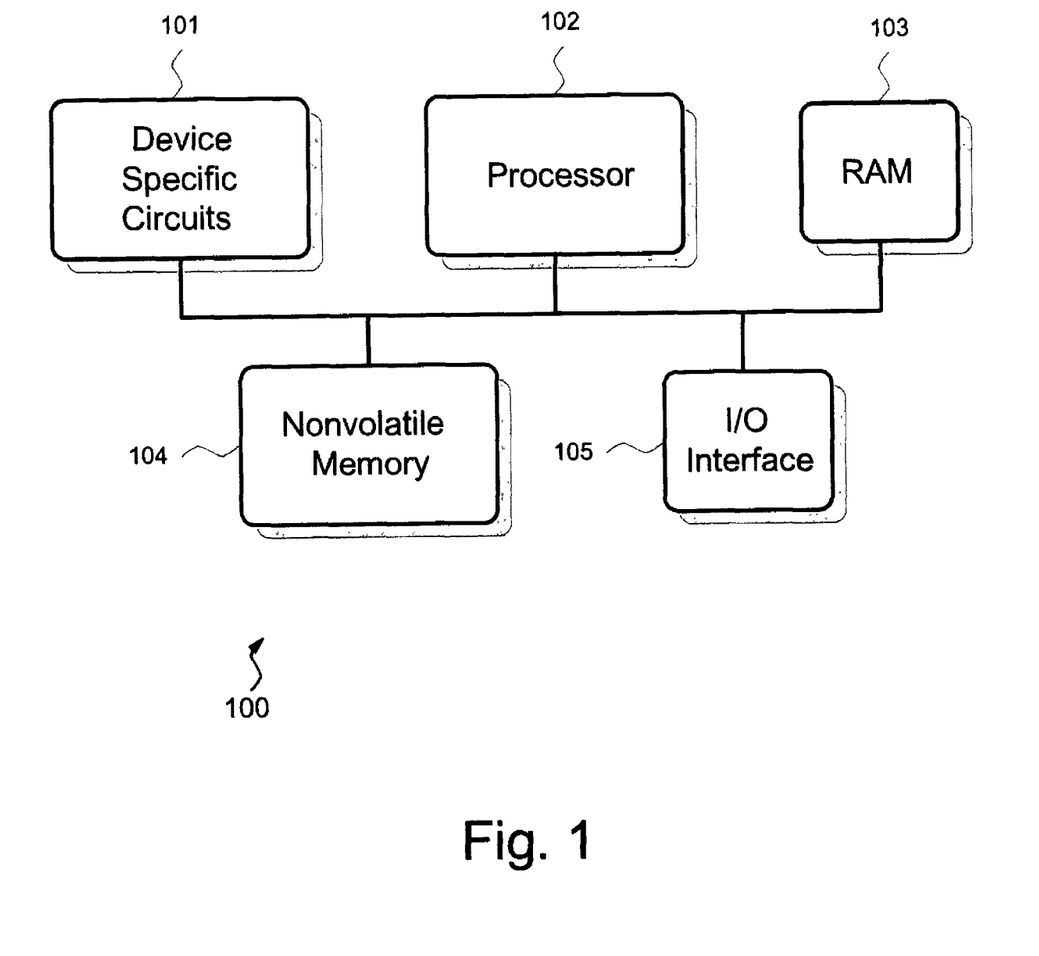
FIG. 1 is a block diagrammatic representation of the electronics used to operate an automated data storage library of the present invention.

An automated data storage library typically contains one or more library controllers to direct the operation of the automated data storage library. The library controller may take many different forms and may comprise an embedded system, a distributed control system, a personal computer, workstation, etc. FIG. 1 shows a typical library controller 100 with a processor 102, RAM 103, nonvolatile memory 104, device specific circuits 101, and I/O interface 105. Alternatively, the RAM 103 and/or nonvolatile memory 104 may be contained in the processor 102 as could the device specific circuits 101 and I/O interface 105. The processor 102 may comprise an off the shelf microprocessor, custom processor, FPGA (Field Programmable Gate Array), ASIC (Application Specific Integrated Circuit), discrete logic, etc. The RAM 103 is typically used to hold variable data, stack data, executable instructions, etc. The nonvolatile memory 104 may comprise any type of nonvolatile memory such as EEPROM (Electrically Erasable Programmable Read Only Memory), flash PROM (Programmable Read Only Memory), battery backup RAM (Random Access Memory), hard disk drive, etc. The nonvolatile memory 104 is typically used to hold the executable firmware and any nonvolatile data. The I/O interface 105 is a communication interface that allows the processor 102 to communicate with devices external to the controller. Examples may comprise serial interfaces such as RS-232 or USB (Universal Serial Bus), SCSI (Small Computer Systems Interface), FC-AL (Fibre Channel-Arbitrated Loop), etc. The device specific circuits 101 provide additional hardware to enable the library controller 100 to perform unique functions such as motor control of a cartridge gripper, etc. The device specific circuits 101 may comprise electronics that provide Pulse Width Modulation (PWM) control, Analog to Digital Conversion (ADC), Digital to Analog Conversion (DAC), etc. In addition, all or part of the device specific circuits 101 may reside outside the library controller 100.

Figure 2:
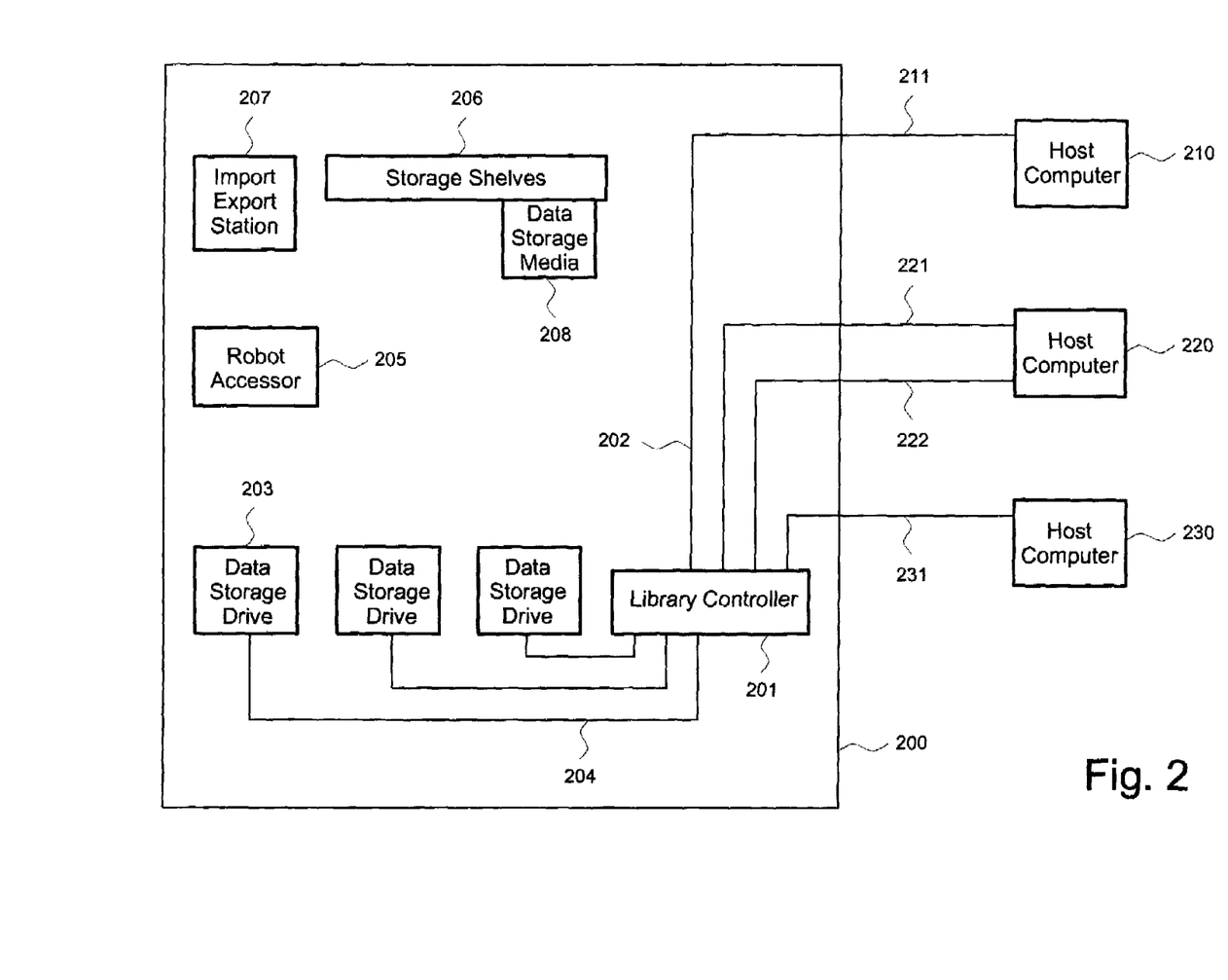
FIG. 2 is a block diagrammatic representation of an automated data storage library connected to more than one host computer.

FIG. 2 shows a block diagram of an automated data storage library 200 and host computers 210, 220 and 230. The host computers 210, 220, 230 connect to the automated data storage library 200 through host communication lines 211, 221, 222 and 231. Host communication lines 211, 221, 222, 231 comprise the control paths into library 200. The host communication lines 211, 221, 222, 231 may comprise RS-232, USB (Universal Serial Bus), SCSI (Small Computer Systems Interface), FC-AL (Fibre Channel-Arbitrated Loop) or any other communication interface known to those of skill in the art. Host communication lines 221 and 222 are redundant control paths between the host and the automated data storage library. One of ordinary skill in the art will recognize that one or more control paths may exist and be used for the present invention. The automated data storage library 200 comprises a library controller 201 such as the library controller 100 of FIG. 1, control path communication lines 202, data storage drives 203, data storage drive communication lines 204, removable data storage media 208 for the storage of data, a robot accessor 205 for transporting the removable data storage media 208, storage shelves 206 for holding the removable data storage media 208, and an optional import/export station 207 for transferring the removable data storage media 208 to/from the data storage library. The library controller 201 may comprise a processor, PC, workstation, embedded system, etc. Alternatively, the library controller 201 may comprise a distributed control system as described in U.S. Pat. No. 6,356,803. The control path communication lines 202 provide control paths into the library 200 and they allow host systems to issue commands to the library 200. Alternatively, the control paths may go through the data storage drives 203 and through the data storage drive communication lines 204, as described in U.S. Pat. No. 6,434,090. In this case, control path communication lines 202 would not be required and host communication lines 211, 221, 222, 231 would be connected directly to data storage drives 203. In any case, the embodiments of this invention do not change, regardless of where the control paths originate.

The data storage drives 203 provide a means for reading and/or writing data with respect to the removable data storage media 208. The data storage drives 203 may comprise optical or magnetic tape drives, optical or magnetic disk drives, electronic media drives, etc. The optional data storage drive communication lines 204 provide a means for communication between the data storage drives 203 and the library controller 201. The data storage drive communication lines 204 may comprise serial connections, such as RS-232 or any other communication protocol as is known to those of skill in the art. The data storage drives may be directly connected to host systems (not shown), such as host computers 210, 220, 230, to read and/or write data to/from removable data storage media 208. In this case, the data storage drive host communication lines (not shown) may comprise RS-232, USB (Universal Serial Bus), SCSI (Small Computer Systems Interface), FC-AL (Fibre Channel-Arbitrated Loop) or any other communication interface known to those of skill in the art. Alternatively, the data storage drives may not be connected to host systems at all. In this case, the library controller 201 would be responsible for the movement of commands and data to/from the data storage drive through data storage drive communication lines 204.

Figure 3:
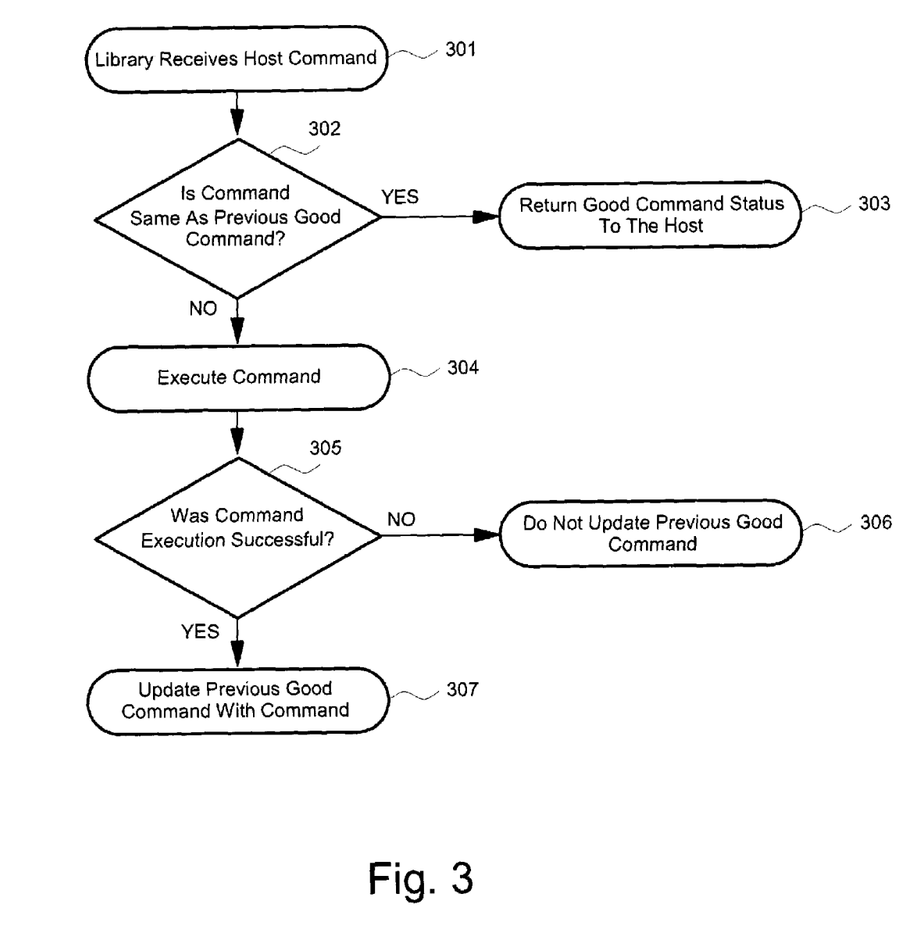
FIG. 3 is a flow chart depicting the operation of the automated data storage library for one embodiment of the present invention.

FIG. 3 illustrates the method of the first embodiment of the present invention as performed by the automated data storage library. In step 301, the automated data storage library receives a host command. At step 302 the automated data storage library decodes the command to determine the type of command and if the command is the same command as a previous good command. A command that was completed successfully would be considered to be a previous good command. The library controller maintains an inventory of previous commands. The inventory may only contain commands that were successfully executed or it may contain the execution status for the commands. This inventory may simply be a copy of the command or it may be some other collection of data that describes the command. The inventory may only comprise the previous command or it may comprise multiple previous commands. In addition, the inventory of previous commands may be organized by the type of command such as a movement command versus a status command. In this example, there may be a command inventory for the previous movement command(s) and there may be another command inventory for the previous status command(s). An inventory of previous commands is used to ultimately determine if a previous command executed successfully. As described above, this may be an inventory of good commands or it may be an inventory of commands that includes enough information about the commands such that the execution success can be determined. Further, an inventory of good commands or an inventory of previous good commands are equivalent and may refer to any of the above descriptions. In this context, a good command is a command that has executed successfully. Herein, when describing the inventory of commands, previous, good, successful, previous good and previous successful all refer to the same thing. The inventory of previous commands may be stored in memory associated with the library controller. RAM 103 and/or nonvolatile memory 104, memory contained in the processor 102, or other memory (not shown in FIG. 1) could be used for the memory portion for the storage of command inventory information. Step 302 captures the case where a command that was sent down one control path actually completed successfully, even though a command completed successfully response may not have been received by the host system that issued that command. Step 302 specifically looks for a duplicate command, from the perspective of the automated data storage library. This duplicate command could be the result of the host sending a retry command because the host did not receive a command completed successfully response from the automated data storage library. This failover procedure initiated by the host computer may use the same control path (as used when the command was first sent) or another control path to send the retry command to the automated data storage library. For example, host 210 may send the command using control path 211 of FIG. 2 and then send the retry command on control path 211. In another example, host 220 may send the command using control path 221 of FIG. 2 and then send the retry command on control path 222 of FIG. 2. Alternatively host 220 may send the retry command on another control path (not shown in FIG. 2) than control path 221 or 222. The host may send the command more than once using any of the control paths that may exist between the host and the automated data storage library. Referring to FIG. 3, if the command is the same as the previous good command, as indicated in step 302, then the automated data storage library returns a good command status to the host in step 303. If however, the command is not the same as the previous good command as indicated in step 302, then control moves to step 304 where the automated data storage library executes the command. At step 305 the library determines if the command executed successfully this time. If the command executed successfully as indicated in step 305, then control moves to step 307 where the inventory of previous good commands is updated with the command that just executed successfully. If however, the command did not execute successfully as indicated in step 305, then control moves to step 306 where the inventory of previous good commands is not updated. Alternatively, the previous good command may be removed from the inventory in step 306. One skilled in the art can see that variations may be made to the flowchart of FIG. 3 without deviating from the sprit of the invention. For example, there may be more than one previous command inventory and it may be based on the type of command received or some other criteria. In this case, step 302 may be modified to check the corresponding command inventory for a previous command. In another example, steps 305 and 306 may be eliminated if the previous command inventory contains the command execution status as described above. In this case, step 307 would update the inventory of previous commands with the current command and its execution status.

Figure 4:
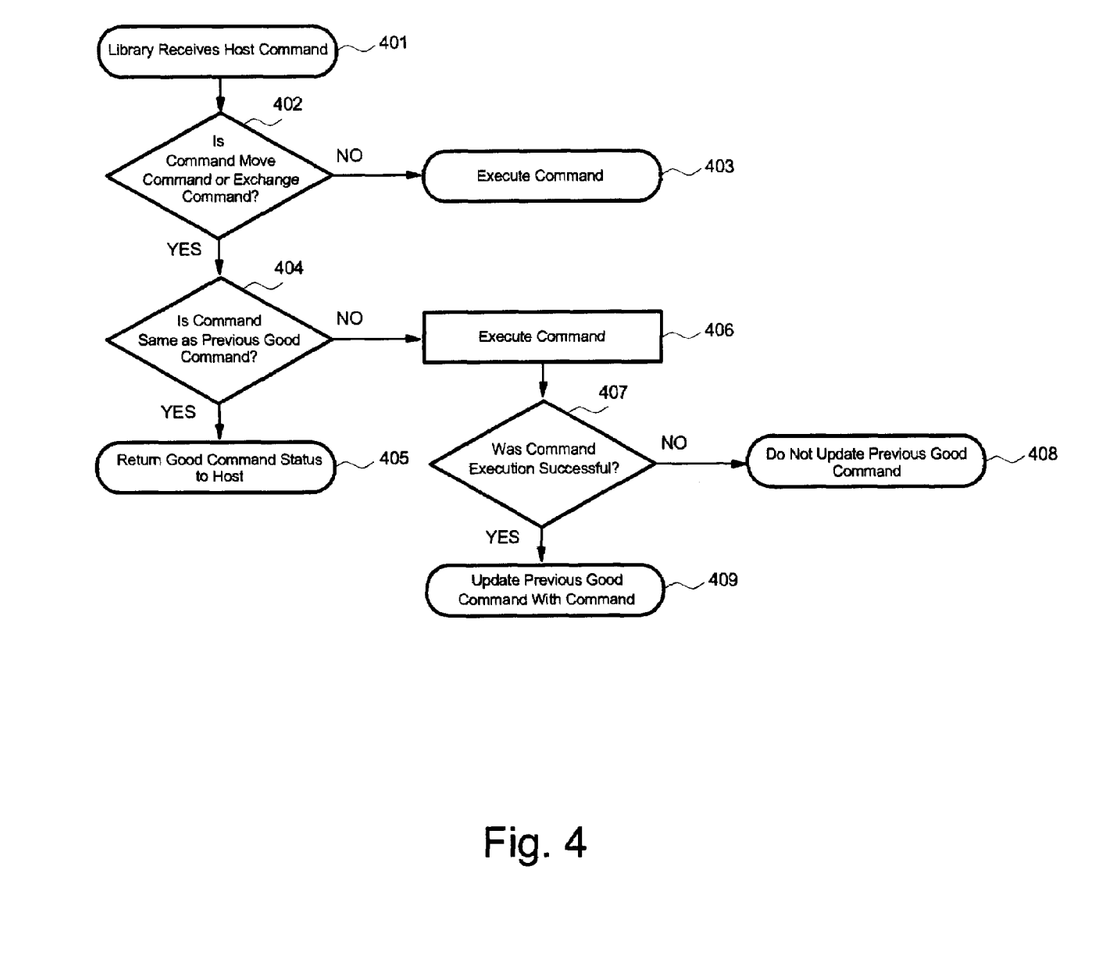
FIG. 4 is a flow chart depicting the operation of the automated data storage library for a second embodiment of the present invention.

FIG. 4 illustrates the method of the second embodiment of the present invention as performed by the automated data storage library. In step 401, the automated data storage library receives a host command. In step 402, the automated data storage library decodes the command to determine the type of command and more specifically determines if the command is a move medium command or an exchange medium command. Move medium commands and exchange medium commands are commands of a general class of transport media commands. Both commands transport data storage media in the automated data storage library. Move medium commands are used to move data storage media from one location to another location within the library. Exchange medium commands are used to improve the performance of a move command by combining more than one move into a single command. If the command is not a move command and not an exchange command, as indicated in step 402, then control moves to step 403 where the automated data storage library executes the host command. Step 402 narrows the problem of correctly handling a failover because any commands other than move or exchange commands will simply be executed with no further checking. If however, the command is a move command or an exchange command, as indicated in step 402, control moves to step 404 where the automated data storage library determines if the command is the same command as the previous good command. A command that was completed successfully would be considered to be a previous good command. The library controller maintains an inventory of previous commands. The inventory may only contain commands that were successfully executed or it may contain the execution status for the commands. This inventory may simply be a copy of the command or it may be some other collection of data that describes the command. The inventory may only comprise the previous command or it may comprise multiple previous commands. In addition, the inventory of previous commands may be organized by the type of command such as a movement command versus a status command. In this example, there may be a command inventory for the previous movement command(s) and there may be another command inventory for the previous status command(s). Step 404 captures the ease where a command that was sent down one control path actually completed successfully, even though a command completed successfully response may not have been received by the host system that issued that command. Step 404 specifically looks for a duplicate command, from the perspective of the automated data storage library. This duplicate command could be the result of the host sending a retry command because the host did not receive a command completed successfully response from the automated data storage library. This failover procedure initiated by the host computer may use the same control path (as used when the command was first sent) or another control path to send the retry command to the automated data storage library. For example, host 210 may send the command using control path 211 of FIG. 2 and then send the retry command on control path 211. In another example, host 220 may send the command using control path 221 of FIG. 2 and then send the retry command on control path 222 of FIG. 2. Alternatively host 220 may send the retry command on another control path (not shown in FIG. 2) than control path 221 or 222. The host may send the command more than once using any of the control paths that may exist between the host and the automated data storage library. Referring to FIG. 4, if the command is the same as the previous good command as indicated in step 404, then control moves to step 405 where the automated data storage library returns a good command status to the host. If however, the command is not the same as the previous good command, as indicated in step 404 then the automated data storage library executes the command in step 406. At step 407 the library determines if the command executed successfully this time. If the command executed successfully as indicated in step 407, then control moves to step 409 where the inventory of previous good commands is updated with the command that just executed successfully. If however, the command did not execute successfully as indicated in step 407, then control moves to step 408 where the inventory of previous good commands is not updated. Alternatively, the previous good command may be removed from the inventory in step 408. One skilled in the art can see that variations may be made to the flowchart of FIG. 4 without deviating from the sprit of the invention. For example, step 402 may include commands other than, or in addition to, move commands and exchange commands. In another example, steps 407 and 408 may be eliminated if the previous command inventory contains the command execution status as described above. In this case, step 409 would update the inventory of previous commands with the current command and its execution status.

Figure 5:
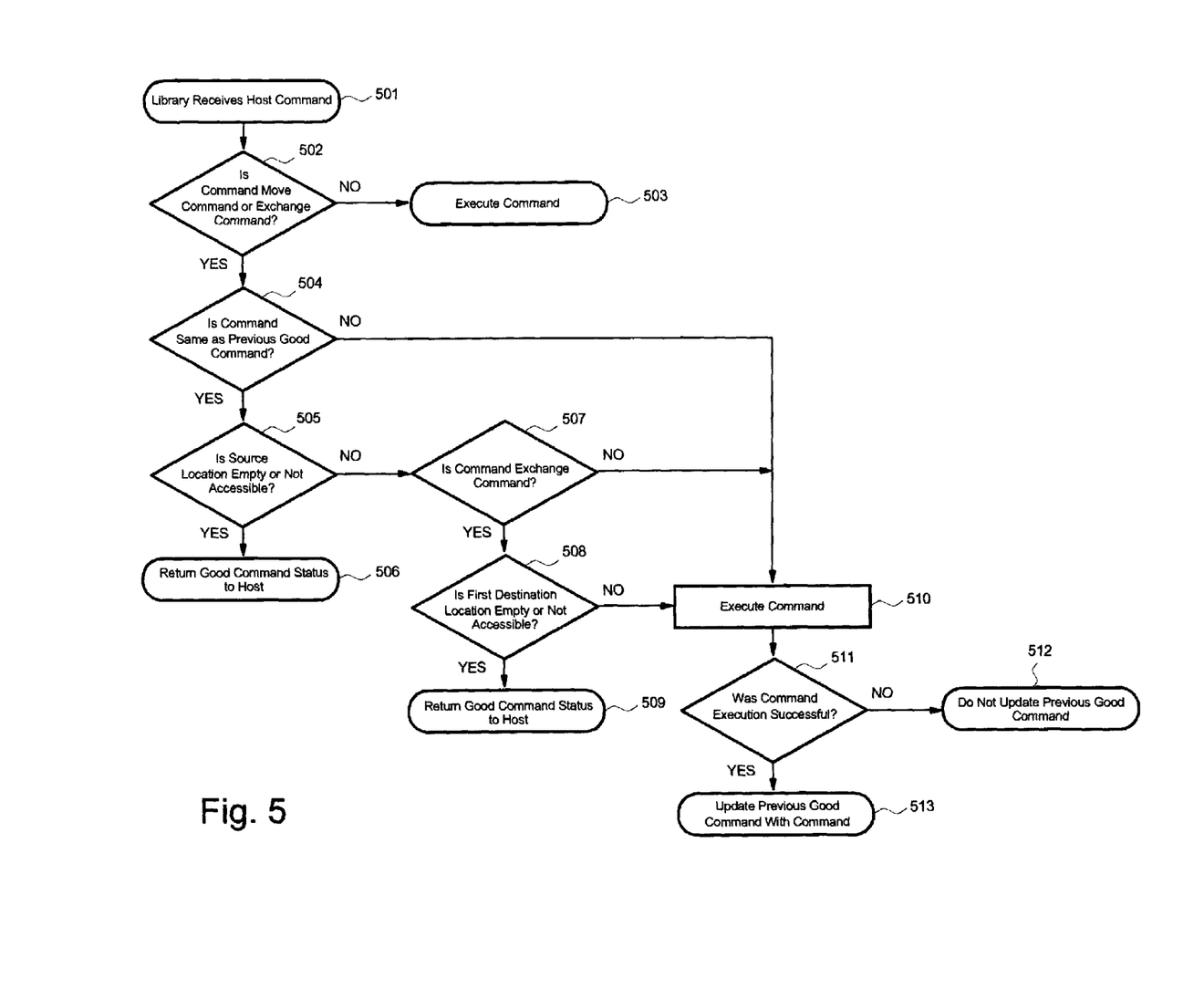
FIG. 5 is a flow chart depicting the operation of the automated data storage library for a third embodiment of the present invention.

FIG. 5 illustrates the method of the third embodiment of the present invention, as performed by the automated data storage library. In step 501, the automated data storage library receives a host command. In step 502, the automated data storage library decodes the command to determine the type of command and more specifically determines if the command is a move medium command or an exchange medium command. Move medium commands and exchange medium commands are commands of a general class of transport media commands. Both commands transport data storage media in the automated data storage library. Move medium commands are used to move data storage media from one location to another location within the library. Exchange medium commands are used to improve the performance of a move command by combining more than one move into a single command. If the command is not a move command and not an exchange command, as indicated in step 502, then control moves to step 503 where the automated data storage library executes the host command. Step 502 narrows the problem of correctly handling a failover because any commands other than move or exchange commands will simply be executed with no further checking. If however, the command is a move command or an exchange command, as indicated in step 502, control moves to step 504 where the automated data storage library determines if the command is the same command as the previous good command. A command that was completed successfully would be considered to be a previous good command. The library controller maintains an inventory of previous commands. The inventory may only contain commands that were successfully executed or it may contain the execution status for the commands. This inventory may simply be a copy of the command or it may be some other collection of data that describes the command. The inventory may only comprise the previous command or it may comprise multiple previous commands. In addition, the inventory of previous commands may be organized by the type of command such as a movement command versus a status command. In this example, there may be a command inventory for the previous movement command(s) and there may be another command inventory for the previous status command(s). Step 504 will capture the case where a command that was sent down one control path actually completed successfully, even though a command completed successfully response may not have been received by the host system that issued that command. Step 504 specifically looks for a duplicate command, from the perspective of the automated data storage library. This duplicate command could be the result of the host sending a retry command because the host did not receive a command completed successfully response from the automated data storage library. This failover procedure initiated by the host computer may use the same control path (as used when the command was first sent) or another control path to send the retry command to the automated data storage library. For example, host 210 may send the command using control path 211 of FIG. 2 and then send the retry command on control path 211. In another example, host 220 may send the command using control path 221 of FIG. 2 and then send the retry command on control path 222 of FIG. 2. Alternatively host 220 may send the retry command on another control path (not shown in FIG. 2) than control path 221 or 222. The host may send the command more than once using any of the control paths that may exist between the host and the automated data storage library. Referring to FIG. 5, if the command is not the same as the previous successful command as indicated in step 504, control moves to step 510 where the automated data storage library executes the move or exchange command. If however, the command is the same as the previous successful command, as indicated in step 504, then control moves to step 505 where the automated data storage library determines if the source location of the move or exchange command is empty or is not accessible. Step 505 further attempts to determine if the command has already been executed. For example, if the last successful command was the same command as the current command then the source location of the move or exchange command should be empty, because this command was already executed successfully. In addition, the accessibility check will further enhance the determination of prior execution as it relates to drives. For example, a cartridge that is loaded into a removable media drive is usually not accessible until the cartridge has been unloaded from the drive. The command may be a move command where the source location and destination location is a single drive. This may happen, for example, as a re-chuck ERP (Error Recovery Procedure) where the media is reloaded because a media load or thread error was detected. The accessibility check would prevent a failover from potentially reloading a cartridge back into a drive. Referring back to FIG. 5, if the source location is empty or is not accessible, as indicated in step 505, then the automated data storage library returns good command status to the host in step 506. If however, the source location is not empty and is accessible, as indicated in step 505, then control moves to step 507 where the automated data storage library determines if the command is an exchange medium command. If the command is not an exchange command, as indicated in step 507, then control moves to step 510 where the automated data storage library executes the move command. If however, the command is an exchange command, as indicated in step 507, then control moves to step 508 where the automated data storage library determines if the first destination location is empty or is not accessible. Step 508 further attempts to determine if the exchange command has already been executed, in a similar manner to step 505. If the first destination location is not empty and is accessible, as indicated in step 508, then control moves to step 510 where the automated data storage library executes the exchange command. If however, the first destination location is empty or is not accessible, as indicated in step 508, then the automated data storage library returns good command status to the host in step 509. As mentioned previously, if the command is not the same as the previous successful command as indicated in step 504, or if the command is not an exchange medium command as indicated in step 507, or if the first destination location is not empty and is accessible as indicated in step 508, then control moves to step 510 where the automated data storage library executes the command. In step 511 the automated data storage library determines if the command executed successfully. If the command executed successfully as indicated in step 511, then control moves to step 513 where the inventory of the previous good commands is updated with the command that just executed successfully. If however, the command did not execute successfully as indicated in step 511, then control moves to step 512 where the inventory of the previous good commands is not updated. Alternatively, the previous good command may be removed from the inventory in step 512. One skilled in the art can see that variations may be made to the flowchart of FIG. 5 without deviating from the method of the current invention. For example, some libraries may not support the exchange medium command and steps 507, 508 and 509 may be eliminated. In this case, a no answer in step 505 would lead to step 510. As another example, steps 502 and 503 may be eliminated or modified to apply the logic of the flowchart to other automated data storage library commands. In this case, the previous good command of steps 504 and 513 may include commands other than, or in addition to, move commands and exchange commands. In addition, step 502 may be eliminated because step 504 would determine if the command has already been executed. In this case, it may be desirable to modify the logic of step 513 to only include certain commands since any automated data storage library command could result in the execution of step 513. Still further, the checks for empty and/or not accessible in step 505 may be modified or removed. For example, it may be desirable to skip any additional checking for empty and/or not accessible since the automated data storage library contains a record of successfully completing the command as the result of step 504. In addition, the check to see if the current command is the same as the last good command of step 504 may be removed since the checking for empty and/or not accessible of step 505 may indirectly capture the case where the command has already been executed. As yet another example, the order of step may be changed. For example, steps 502 and 504 may be swapped. Finally, steps 511 and 512 may be eliminated if the previous command inventory contains the command execution status as described above. In this case, step 513 would update the inventory of previous commands with the current command and its execution status.

Figure 6:
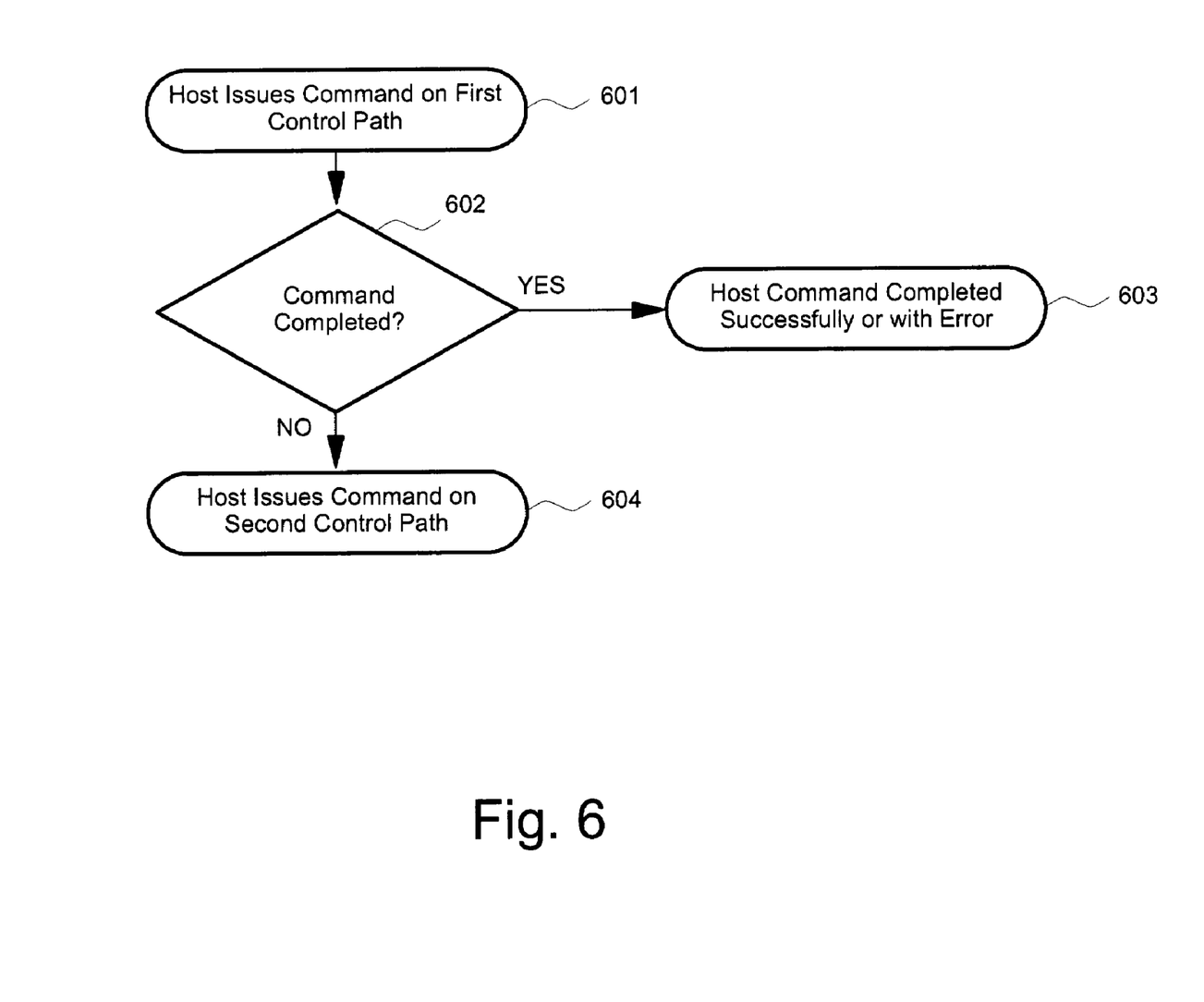
FIG. 6 is a flow chart depicting the operation of the host computer for the present invention.

FIG. 6 illustrates the method of all three embodiments described above, as performed by the host computer. In step 601, the host computer issues a command on a first control path, such as host communication lines 221 of FIG. 2. In step 602, the host computer determines if the command completed. Command completion may comprise status of successful command completion. Alternatively, command completion may additionally comprise status of unsuccessful command completion. For example, some command errors may be the result of a problem with the control path, while other command errors may be the result of problems that have nothing to do with which control path a command is issued through. Therefore, it may be desirable to treat some errors differently than others. Alternatively, step 602 may only check that the command completed successfully. Referring back to FIG. 6, if the command completed, as indicated in step 602, control moves to step 603 where the host considers the control path good and handles the command response appropriately. If however, the automated data storage library command did not complete, as indicated in step 602, then control moves to step 604 where the host issues the same command (retry command) on a second control path, such as host communication lines 222 of FIG. 2. Alternatively, the host may issue the same command (retry command) on the same control path. Steps 602, 603 and 604 may be repeated for the same, or additional control paths. This would allow any number of attempted control path failovers.

In another embodiment of this invention, the host computer sends the same command down two or more control paths at the same time. Since one command will always arrive prior to the other command, from the perspective of the library controller, the logic that the library performs will be the same as described in FIGS. 1 through 5. Instead of managing retries, the host computer would monitor duplicate responses. Herein, any sequence of host commands that results in the library executing the logic described by this invention shall be referred to as host retries.

While this invention was largely described in terms of a single host computer with redundant control paths, it may be applied to a single control path. For example, a host computer may have more than one host bus adapter connected to a single library control path. A failure of one host bus adapter could cause the host to use another host bus adapter to retry the command on the same control path. The host bus adapter comprises circuits that the host may use to provide communication over a SCSI (Small Computer Systems Interface) bus, FC-AL (Fibre Channel-Arbitrated Loop) bus, USB (Universal Serial Bus), or any other communication method as is known to those of skill in the art.

While this invention was described in terms of a single host computer with multiple control paths, it may be applied to multiple host computers sharing one or more control paths. In this case, the inventory for previous good commands may be expanded to include information regarding which host the command is associated with. This additional information may be used to compare a current command to a previous command from the same host.

While the preferred embodiments of the present invention have been illustrated in detail, the skilled artisan will appreciate that modifications and adaptations to those embodiments may be made without departing from the scope of the present invention as set forth in the following claims.

What is claimed is:

1. A method of managing retry commands communicated between a host computer and an automated data storage library, said host computer communicating with said automated data storage library using one or more control paths, and said automated data storage library including a library controller for controlling said automated data storage library, and wherein said automated data storage library includes data storage media and a means for transporting said data storage media, where said method comprises the steps of:

said host computer sending a command to said automated data storage library using one of said one or more control paths;

in response to said host not receiving a command completed successfully response, said host computer sending a retry of said command to said automated data storage library using any of said one or more control paths;

said automated data storage library receiving and decoding said command, wherein said step of automated data storage library receiving and decoding said command further comprises said automated data storage library executing said retry of said command if said command is not a command to transport said data storage media; and said automated data storage library sending said command completed successfully response to said host computer without executing said retry of said command if said command was already executed in response to said command sent to said automated data storage library using said one of said one or more control paths.

2. The method of claim 1, wherein said library controller includes a memory portion for the storage of an inventory of good commands, said method comprising the additional steps of:

said automated data storage library executing said retry of said command if said command was not already executed in response to said command sent to said automated data storage library using said one of said one or more control paths; and said automated data storage library updating said inventory of good commands with said command if execution of said retry of said command was successful.

3. The method of claim 1, wherein said library controller includes a memory portion for the storage of an inventory of good commands, said method comprising the additional steps of:

said automated data storage library executing said retry of said command if said command was not already executed in response to said command sent to said automated data storage library using said one of said one or more control paths; and said automated data storage library updating said inventory of good commands with said command if execution of said retry of said command was successful.

4. The method of claim 1 wherein said step of said automated data storage library receiving and decoding said command further comprises the step of:

said automated data storage library not executing said retry of said command if said command is a command to transport said data storage media and the library location specified by the source address of said command is empty.

5. The method of claim 4, wherein said library controller includes a memory portion for the storage of an inventory of good commands, said method comprising the additional steps of:

said automated data storage library executing said retry of said command if said command was not already executed in response to said command sent to said automated data storage library using said one of said one or more control paths; and said automated data storage library updating said inventory of good commands with said command if execution of said retry of said command was successful.

6. The method of claim 1 wherein said step of said automated data storage library receiving and decoding said command further comprises the step of:
said automated data storage library not executing said retry of said command if said command is an exchange command and the library location specified by the first destination address of said exchange command is empty.

7. The method of claim 6, wherein said library controller includes a memory portion for the storage of an inventory of good commands, said method comprising the additional steps of:
said automated data storage library executing said retry of said command if said command was not already executed in response to said command sent to said automated data storage library using said one of said one or more control paths;
said automated data storage library updating said inventory of good commands with said command if execution of said retry of said command was successful.

8. A system for managing retry commands communicated between a host computer and an automated data storage library, said system comprising:
one or more control paths used for communication between said host computer and said automated data storage library;
a library controller for controlling said automated data storage library;
data storage media used for the storage of data;
a means for transporting said data storage media;
said host computer adapted for sending a command to said automated data storage library using one of said one or more control paths;
said host computer adapted for sending a retry of said command to said automated data storage library using any of said one or more control paths in response to said host not receiving a command completed successfully response;
said automated data storage library adapted for receiving and decoding said command;
said automated data storage library adapted for executing said retry of said command after said decoding said command if said command is not a command to transport said data storage media; and
said automated data storage library adapted for sending said command completed successfully response to said host computer without executing said retry of said command if said command was already executed in response to said command sent to said automated data storage library using said one of said one or more control paths.

9. The system of claim 8, further comprising:
a memory portion for the storage of an inventory of good commands, said memory portion coupled to said library controller;
said automated data storage library adapted for executing said retry of said command if said command was not already executed in response to said command sent to said automated data storage library using said one of said one or more control paths; and
said automated data storage library adapted for updating said inventory of good commands with said command if execution of said retry of said command was successful.

10. The system of claim 8, further comprising:
a memory portion for the storage of an inventory of good commands, said memory portion coupled to said library controller;
said automated data storage library adapted for executing said retry of said command if said command was not already executed in response to said command sent to said automated data storage library using said one of said one or more control paths; and
said automated data storage library adapted for updating said inventory of good commands with said command good status if execution of said retry of said command was successful.

11. The system of claim 8, further comprising:
said automated data storage library adapted for not executing said retry of said command after said decoding said command if said command is a command to transport said data storage media and the library location specified by the source address of said command is empty.

12. The system of claim 11, further comprising:
a memory portion for the storage of an inventory of good commands, said memory portion coupled to said library controller;
said automated data storage library adapted for executing said retry of said command if said command was not already executed in response to said command sent to said automated data storage library using said one of said one or more control paths; and
said automated data storage library adapted for updating said inventory of good commands with said command if execution of said retry of said command was successful.

13. The system of claim 8, further comprising:
said automated data storage library adapted for not executing said retry of said command after said decoding said command if said command is an exchange command and the library location specified by the first destination address of said exchange command is empty.

14. The system of claim 13, further comprising:
a memory portion for the storage of an inventory of good commands, said memory portion coupled to said library controller;
said automated data storage library adapted for executing said retry of said command if said command was not already executed in response to said command sent to said automated data storage library using said one of said one or more control paths; and
said automated data storage library adapted for updating said inventory of good commands with said command if execution of said retry of said command was successful.

* * * * *